United States Patent [19]

Eddy

[11] Patent Number: 5,872,674
[45] Date of Patent: Feb. 16, 1999

[54] ACTUATOR BIAS PREDICTION USING LOOKUP-TABLE HYSTERESIS MODELING

[75] Inventor: Kyle K. Eddy, Bloomington, Minn.

[73] Assignee: Seagate Technology, Inc., Scotts Valley, Calif.

Related U.S. Application Data

[60] Provisional application No. 60/031,909 Nov. 22, 1996.

[21] Appl. No.: 846,545

[22] Filed: Apr. 30, 1997

[51] Int. Cl.$^6$ .................................................. G11B 5/596
[52] U.S. Cl. ..................................... 360/78.09; 360/77.04
[58] Field of Search ............................. 360/78.09, 78.14, 360/78.05, 78.06, 78.07, 78.11, 77.04, 77.06, 77.08, 77.05; 369/44.28, 32

[56] References Cited

U.S. PATENT DOCUMENTS

| | | | |
|---|---|---|---|
| 4,697,127 | 9/1987 | Stich et al. | 360/78.09 |
| 5,333,083 | 7/1994 | Nakano | 360/77.04 |
| 5,404,253 | 4/1995 | Painter | 360/78.09 |
| 5,404,255 | 4/1995 | Kobayashi et al. | 360/78.09 |
| 5,444,583 | 8/1995 | Ehrlich et al. | 360/78.09 |
| 5,455,724 | 10/1995 | Suzuki et al. | 360/77.04 |
| 5,576,909 | 11/1996 | Dierkes et al. | 360/77.04 |

OTHER PUBLICATIONS

"A State Space Bias Model for Prediction of Actuator Tracking Bias in Hard Disk Drives" by Kyle Eddy and William Messner (presented and distributed at the Nov. 1995 Winter Annual Meeting of the ASME).

*Primary Examiner*—Thang V. Tran
*Attorney, Agent, or Firm*—Kinney & Lange, P.A.

[57] ABSTRACT

An actuator system for positioning a transducing head on an actuator arm over a selected track of a rotatable disc having a plurality of concentric tracks is disclosed. The actuator arm includes a motor responsive to an actuator signal and a bias signal to move the head with respect to the tracks. The actuator signal is applied to the motor to move the head between tracks on the disc. After the head has been moved between tracks, the bias signal is applied to the motor to center the head over the selected track. A lookup table is provided to store predicted bias values in locations addressable by seek direction, previous seek direction, seek length and head position. The bias signal is applied in response to a selectively accessed predicted bias value.

17 Claims, 6 Drawing Sheets

5,872,674

ACTUATOR BIAS PREDICTION USING LOOKUP-TABLE HYSTERESIS MODELING

CROSS-REFERENCE TO RELATED APPLICATIONS

This application claims priority from Provisional Application No. 60/031,909 filed Nov. 22, 1996 for "Actuator Bias Prediction Using Lookup-Table Hysteresis Modeling" by K. Eddy.

BACKGROUND OF THE INVENTION

This invention relates to a system for predicting bias effects on an actuator arm in a disc drive system using a lookup table.

There has been an effort to increase the radial density of concentric data tracks in high performance hard disc drives. As a result, there is an increasing need for higher order modeling and compensation for previously overlooked mechanical and electrical non-linear behavior in the actuation system used to position a head over a selected track of the disc. One such non-linear effect is associated with actuator bias. A rotary voice coil-driven actuator experiences variable amounts of torque (bias) at various radial positions relative to the disc. This bias is a result of several factors, including spring action operating on the actuator due to the flexible cable connecting the arm electronics to the disc drive electronics, windage acting on the arm, hysteresis friction in the actuator bearings, and other factors. Thus, the current required to maintain the head over the selected track of the disc might vary due to the bias.

During tracking, it has become common to compensate for direct current (DC) bias effects by applying a fixed bias current to the actuator arm. While the fixed bias provides reasonably good compensation for tracking operations after long seeks, it is not altogether accurate for tracking after short seeks that follow direction reversals, especially as radial track density increases requiring greater precision. The fixed bias model typically consists of a pair of second order polynomial curves, one each for seeks in the inbound and outbound directions. However, for relatively short seeks, the second order model may be insufficient to precisely predict and model the bias characteristics of the disc drive system, thereby increasing the time required to perform a track seek and settle on a desired track of the disc. The closer the predicted value of bias is to the actual amount of bias necessary to center the head over the selected track, the less settling time is required.

The shortcomings of second order polynomial models are specifically addressed in "A State-Space Bias Model for Prediction of Actuator Tracking Bias in Hard Disk Drives" by Kyle Eddy and William Messner (presented and distributed at the November 1995 Winter Annual Meeting of the ASME). The Eddy et al. paper reveals that the physical bias curve forms a hysteresis loop for short seeks following a change in actuator direction, which can itself be modeled as fitted exponential curves. However, overshoot and undershoot effects still existed in the actuator bias following a reversal in actuator direction, which could not be accurately predicted even by the exponential model.

Therefore, a need exists for a system which introduces bias into an actuator assembly of a disc drive that accounts for hysteresis, overshoot, undershoot, and other bias characteristics, improves tracking performance, and reduces the time required to settle over a desired track.

SUMMARY OF THE INVENTION

The present invention is an actuator system for positioning a transducing head on an actuator arm over a selected track of a rotatable disc having a plurality of concentric tracks. The actuator arm includes a motor responsive to an actuator signal and a bias signal to move the head with respect to the tracks. A seek controller applies the actuator signal to the motor to move the head between tracks on the disc. A tracking controller applies the bias signal to the actuator arm to center the head over the selected track of the disc. The tracking controller includes a lookup table storing predicted bias values, and address means responsive to seek direction, previous seek direction, seek length and head position to select a predicted bias value from the lookup table. The tracking controller is responsive to the bias value selected from the lookup table to apply the bias signal.

According to one aspect of the invention, the lookup table is calibrated by performing a plurality of seek operations, measuring the bias signal required to settle the head over a seek destination track, and storing a bias value representative of the measured bias signal in a selectively addressable location of the lookup table. In a further aspect, the address means is responsive to a reversal in direction of traversal of tracks to select a predicted bias value from the lookup table, and the tracking controller accesses the predicted value of bias when the seek operation requires traversal of a number of tracks less than a predetermined number of tracks.

Another aspect of the invention is a method of positioning a transducing head on an actuator arm over a selected track of a rotatable disc having a plurality of concentric tracks by operating a motor. Predicted bias values are stored in locations of a lookup table that are addressable by seek direction, previous seek direction, seek length and head position. A first actuator control signal is applied to the motor to move the head between tracks. The lookup table is accessed to select a predicted value of bias addressed by seek direction, previous seek direction, seek length and head position. A second actuator control signal is applied to the motor, based on the selected predicted value of bias, to center the head over the selected track of the disc.

DETAILED DESCRIPTION OF THE PREFERRED EMBODIMENTS

Figure 1:
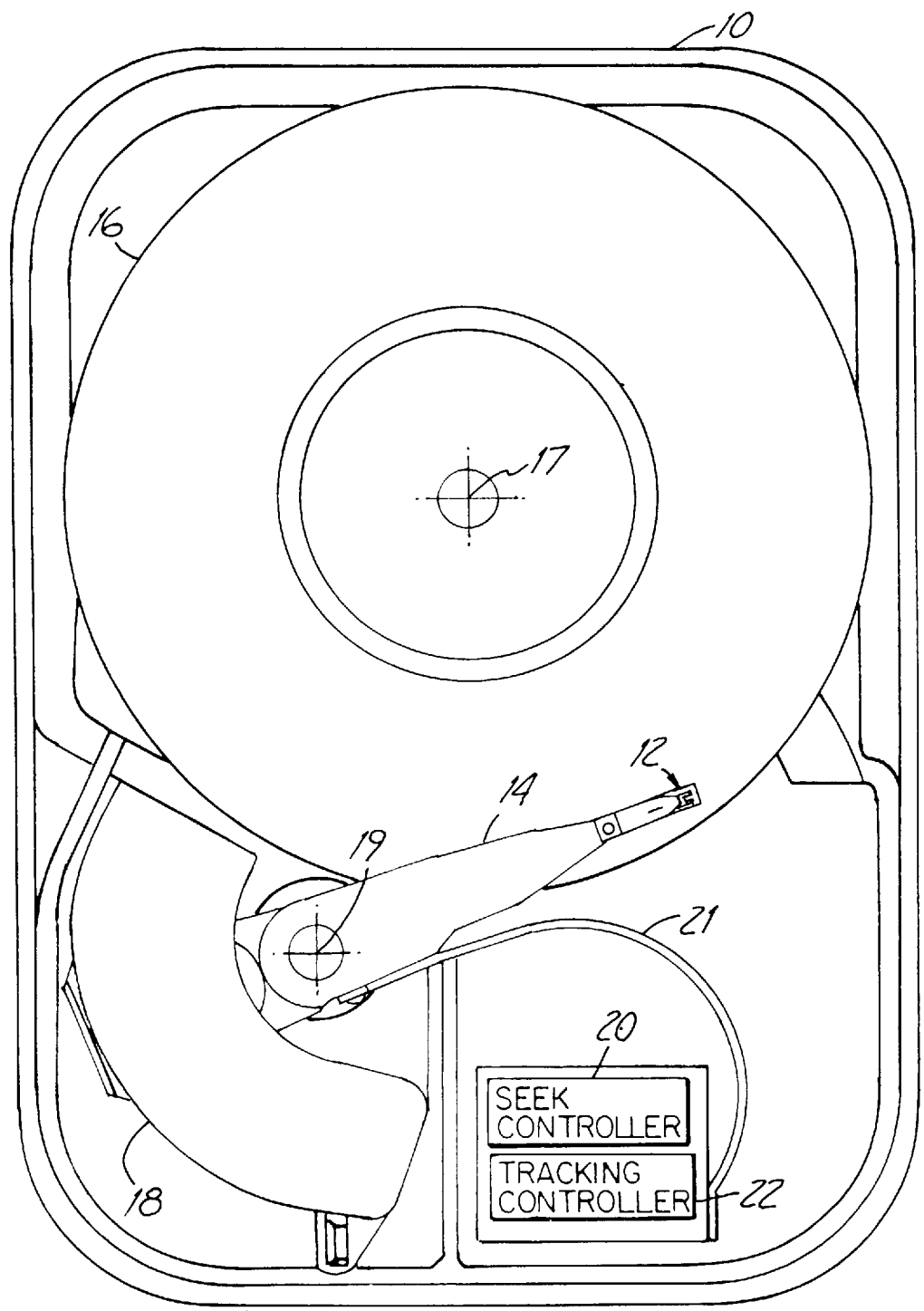
FIG. 1 is a diagrammatic illustration of an actuator for a disc drive system having a seek controller and a tracking controller.

FIG. 1 is a plan view of a disc drive 10 including an actuator to position head 12 on actuator arm 14 over a selected track of disc 16, rotatable around axis 17. Voice coil motor (VCM) 18 accelerates the actuator arm about axis 19 in a first direction in response to an actuator current of a first polarity or direction, and in a second opposite direction in response to an actuator current of a second, opposite polarity or direction. A seek controller 20 and a separate tracking controller 22 are connected to VCM 18 to regulate the current delivered to the VCM. Seek controller 20 manages gross movement of actuator arm 14 to carry head 12 across several data tracks on the disc, and tracking controller 22 centers head 12 on actuator arm 14 over the destination data track. Controllers 20 and 22 supply current to VCM 18 to position head 12 on actuator arm 14 over a selected data track of disc 16.

Figure 2:
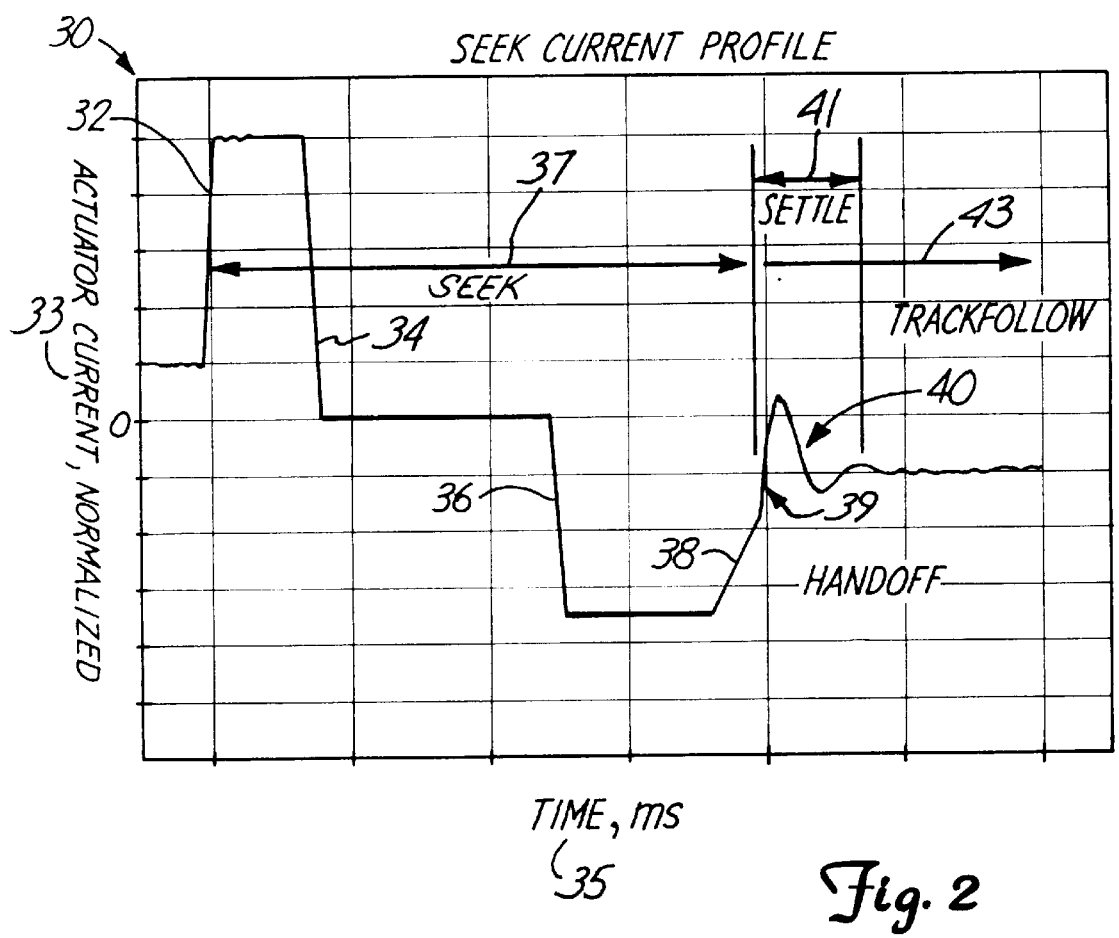
FIG. 2 is a graph illustrating a typical seeking and tracking current profile for a disc drive actuator coil.

FIG. 2 shows a typical control scheme in the form of seeking and tracking current profile 30 which is applied to a VCM to move a head on an actuator arm between selected tracks of a rotatable disc, with normalized actuator current 33 shown on the Y-axis and time 35, in milliseconds, shown on the X-axis. Upon receiving a signal indicating that the head is to be moved to a different track, the actuator is operated by a current 32 of a given polarity or direction (which determines the direction of movement of the actuator). The actuator thus begins accelerating toward the destination track. When the actuator arm has reached a predetermined velocity, actuator current is reduced to zero or near zero, as indicated at 34, to maintain the predetermined velocity of arm movement. Once the arm has moved to a predetermined track relative to the destination track, an opposite actuator current is applied to the VCM as shown at 36 to decelerate the actuator movement, until the head is positioned very nearly over the destination track. At this point, the actuator current is returned toward zero as shown at 38, and control of the actuator arm is passed from seek controller 20 to tracking controller 22 (FIG. 1). The time from initial application of actuator current to handoff point 39 is the seek time 37. At handoff point 37, the tracking controller is initialized with a bias value. Assuming that the velocity and position error of the actuator arm and head are near zero at handoff point 39, the tracking controller settles the head over the selected track at 40 (with settling time 41), delivering the proper amount of current to maintain the head over the center of the track, as shown in track follow region 43. The closer the predicted initial value of bias loaded into the tracking controller is to the actual bias required to maintain the head over the selected track, the less settling time is required. Thus, accurate prediction of bias is essential to facilitate rapid head positioning over a selected track.

Figure 3:
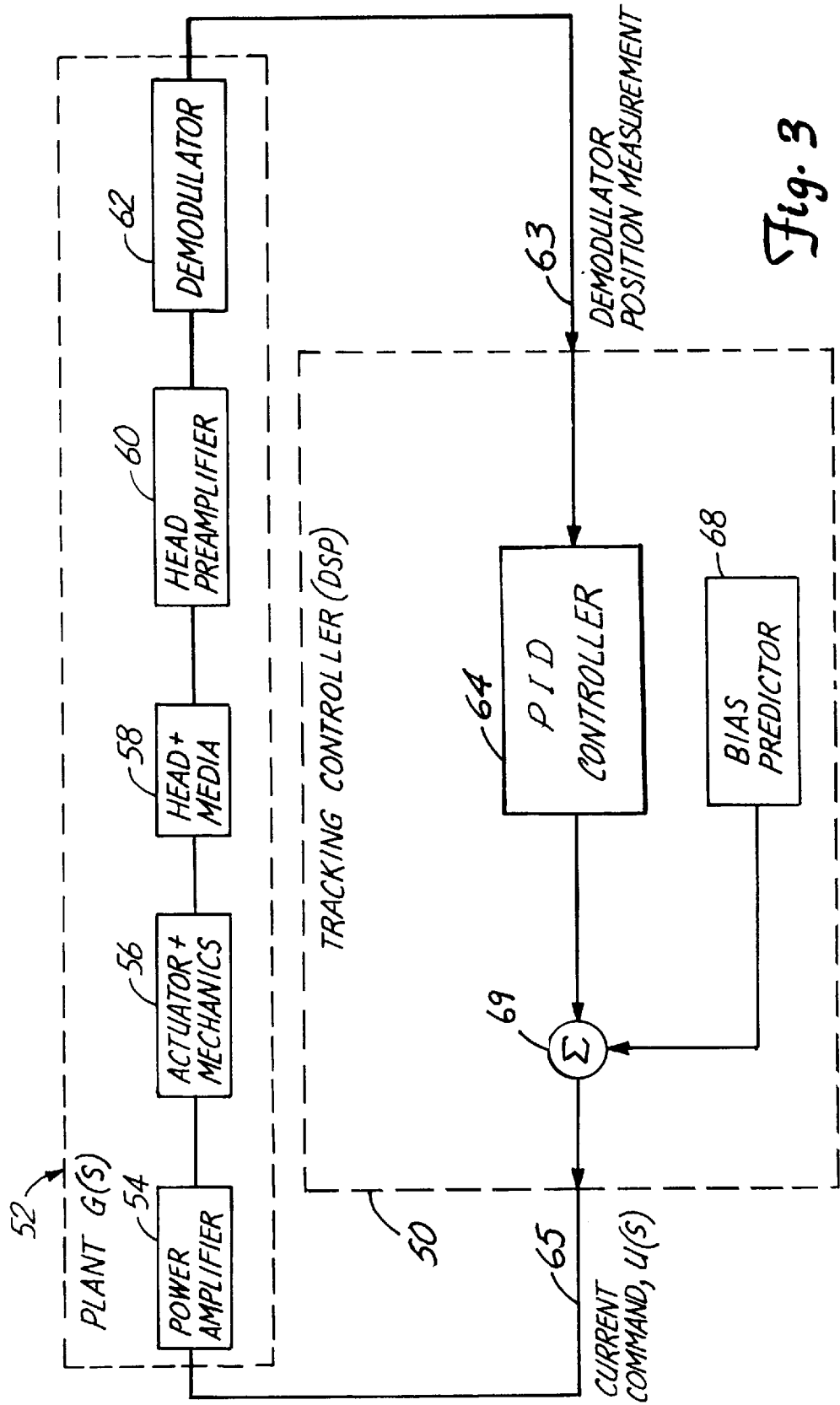
FIG. 3 is a block diagram showing the functional blocks of a tracking controller and actuator plant in a disc drive system.

FIG. 3 is a block diagram illustrating the functional blocks and relationships of tracking controller 50 and actuator arm plant 52. Plant 52 includes power amplifier 54, actuator mechanics 56, head and media 58, head preamplifier 60, and demodulator 62. Power amplifier 54 converts a control signal from a voltage into a current. Actuator mechanics 56 is the mechanical actuator arm of the disc drive, driven by a voice coil motor. Actuator mechanics 56 operate to accelerate and decelerate the actuator arm at a rate proportional to the current delivered from power amplifier 54. Head and media block 58 represents the transducing head reading the servo pattern encoded on the disc. The servo pattern contains information indicating the radial position of the head over the disc. The output of head and media block 58 is a low level signal containing encoded head position information. Head preamplifier 60 is a highly sensitive, low noise amplifier that amplifies the head position signal from the head and media block 58 to a level where it is relatively immune to spurious noise in the disc drive electronics. Demodulator 62 interprets the amplified head position signal, and supplies a position error signal on line 63 representative of head position to tracking controller 50.

Tracking controller 50 is preferably implemented as a digital signal processor (DSP), and includes proportional integrator differentiator (PID) controller 64, bias predictor 68, and summer 69. Tracking controller 50 outputs a current command signal to plant 52 that moves the head on the actuator arm by operating the voice coil motor with a selected value of bias current. The current command signal is made up of a time-varying alternating current (AC) component, which accounts for small position disturbances and noise in the actuator system, and a constant direct current (DC) component to overcome the constant bias forces on the actuator.

PID controller 64 is known in the art, and operates to analyze the demodulated head position error signal and output a command current to center the head over the selected track of the disc. PID controller 64 includes proportional, integrator, and differentiator functions. The differentiator function accounts for any instantaneous changes in the position error signal by determining an AC current component necessary to adjust head position for the instantaneous error. The integrator function accounts for consistently repeated head position errors by determining a DC current component necessary to overcome the constant bias forces on the actuator (i.e. the steady-state error). Bias predictor 68 outputs a constant DC current value based on a predicted bias for the selected track number. The predicted bias value is determined by a mathematical model implemented in the bias predictor. The signals are added by summer 69 to form the current command signal on line 65 which operates plant 52 to position the head.

In operation, during a track seek, seek controller 20 (FIG. 1) is operated to move the head near the destination track, where the handoff to tracking controller 22 described above occurs. Initially, bias predictor 68 provides a bias current to plant 52, the bias current being selected from a lookup table on the basis of factors described below. PID controller 64 continually analyzes the position error signal (line 63) to provide AC and DC currents to compensate for transient bias forces and errors in the predicted bias current, respectively. The integrating function of PID controller 64 requires time to determine DC current adjustments, making it imperative that the DC current adjustment be minimized, since only a short period of time is allowed to center the head on track. Thus, it is important that bias predictor 68 predict the DC bias current required to maintain the head over the selected track as accurately as possible. The integrating function of PID controller 64 is accordingly initialized with a DC bias current value of zero. If the predicted value of bias current is approximately equal to the actual DC current required to maintain the head on the center of the selected track, the integrating function of PID controller 64 will be able to quickly settle the head on track.

Figure 4:
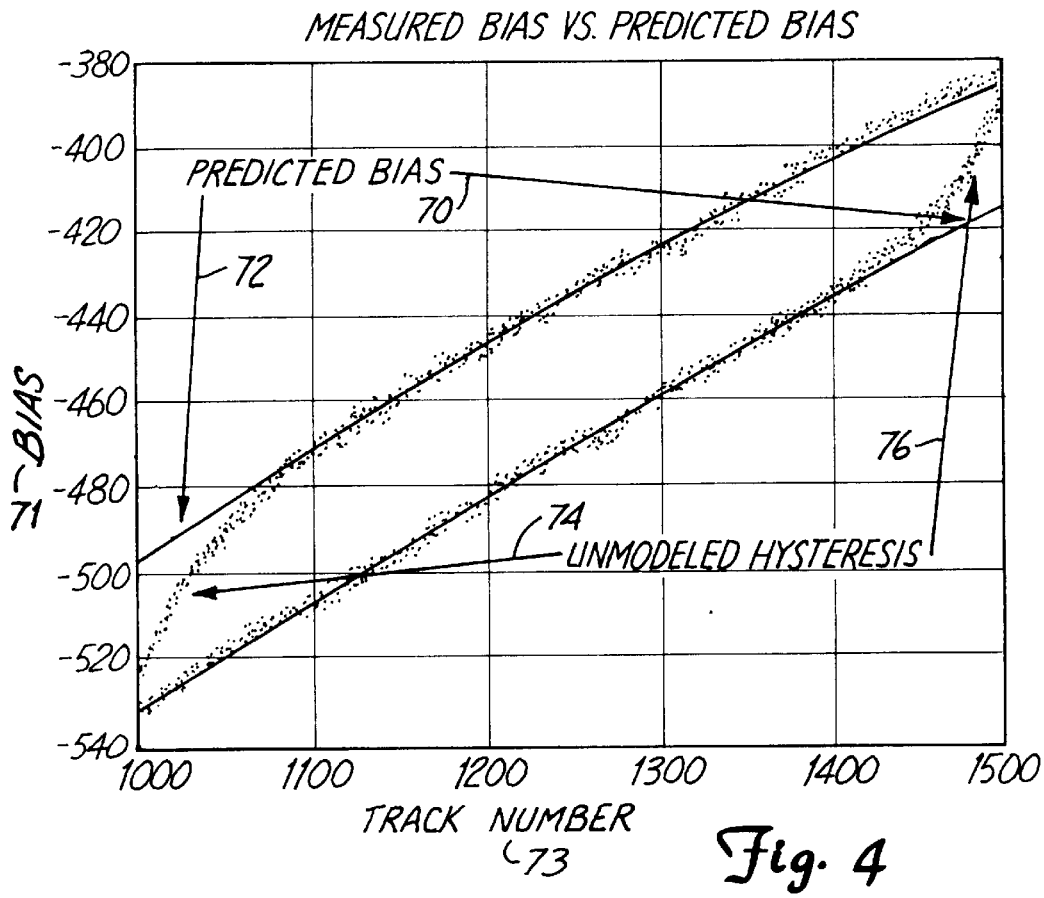
FIG. 4 is a graph illustrating the divergence of predicted bias and actual bias for representative seek operations performed in a disc drive system.

FIG. 4 is a graph illustrating the divergence of predicted bias and actual bias for a series of single-track seek operations from track 1000 to track 1500 and a subsequent series of single-track seek operations from track 1500 to track 1000, performed, for example, in a Barracuda 9 disc drive manufactured by Seagate Technology, Inc. of Scotts Valley, Calif. Bias 71 is shown on the Y-axis, and track number 73 is shown on the X-axis. The second order polynomial model of bias for inbound seeks is represented as curve 70, and the second order polynomial model of bias for outbound seeks is represented as curve 72. The series of single-track seek operations from track 1000 to track 1500 exhibits initial hysteresis 74 before conforming to predicted outbound bias curve 72. Likewise, the series of single-track seek operations from track 1500 to track 1000 exhibits initial hysteresis 76 before to predicted inbound bias curve 70. A change in the direction of actuator movement results in hysteresis effects 74 and 76 shown in FIG. 3, which are not compensated for by second order polynomial models 70 and 72. The hysteresis effects significantly influence bias for seeks following an actuator direction change even if the direction change occurs several seconds after the previous seek has been completed and the head has settled on track. In actual operation of a disc drive system, successive seeks are performed well within this time period.

The hysteresis curves caused by changes in actuator direction can themselves be modeled by fitting exponential curves selectively inverted to model inbound and outbound hysteresis effects. This mathematical modeling process is described in "A State-Space Bias Model for Prediction of Actuator Tracking Bias in Hard Disk Drives" by Kyle K. Eddy and William Messner (presented and distributed at the November 1995 Winter Annual Meeting of the ASME). While this mathematical model provides superior bias prediction to the polynomial modeling scheme, it is computationally intensive and difficult to calibrate for a particular disc drive system, and still can fall short of precisely modeling all features of the actual bias curve for some disc drives.

Figure 5:
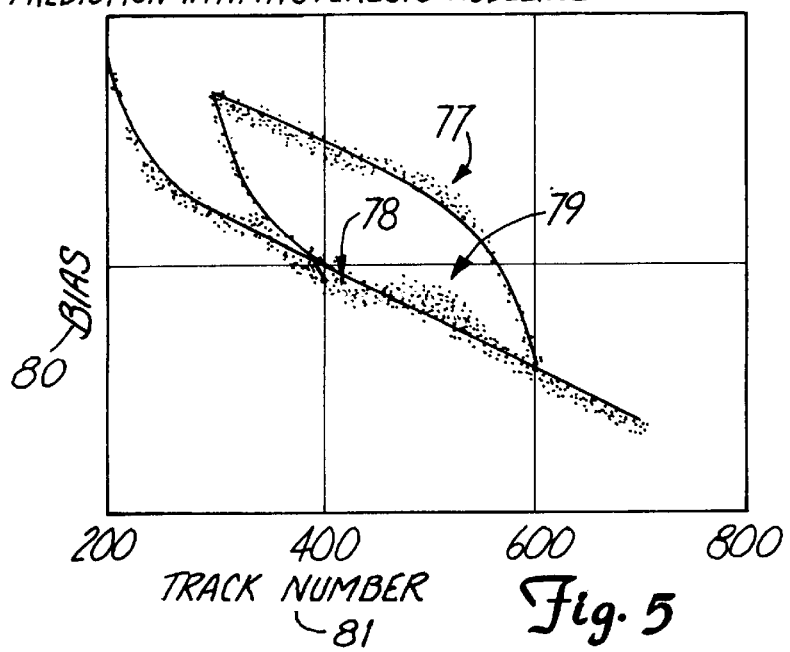
FIG. 5 is a graph illustrating actual bias characteristics in a representative series of seek operations that are not precisely modeled by fitted exponential curves.

FIG. 5 is a graph illustrating unmodeled variations from the exponentially fitted curves for a series of sequential seek operations from track 200 to track 600, from track 600 to track 300, and from track 300 to track 700. Bias 80 is shown on the Y-axis, and track number 81 is shown on the X-axis. The solid line in FIG. 5 represents the exponential model of predicted bias, while the dots represent actual bias measurements. After the direction change at track 600, the actual bias closely follows the predicted bias along the hysteresis curve, but then exhibits unmodeled overshoot at 77, approximately 100 tracks after the direction change. Similarly, after the direction change at track 300, the actual bias closely follows the predicted bias along the hysteresis curve, but then exhibits unmodeled overshoot at 78 approximately 100 tracks after the direction change, and reciprocating unmodeled undershoot at 79 approximately 200 tracks after the direction change. While not wishing to be bound by any particular theory, it is hypothesized that the overshoot and undershoot characteristics may result from a building of lubricating grease on one side of the actuator bearing, which must be overcome when actuator direction is reversed. These characteristics may also be affected by tension in the cable connecting the arm to the disc drive electronics, or by other factors. Regardless of the true cause of these unmodeled effects, it is apparent that even the improved exponential model cannot always precisely predict bias in every disc drive system, particularly for short seeks.

Figure 6:
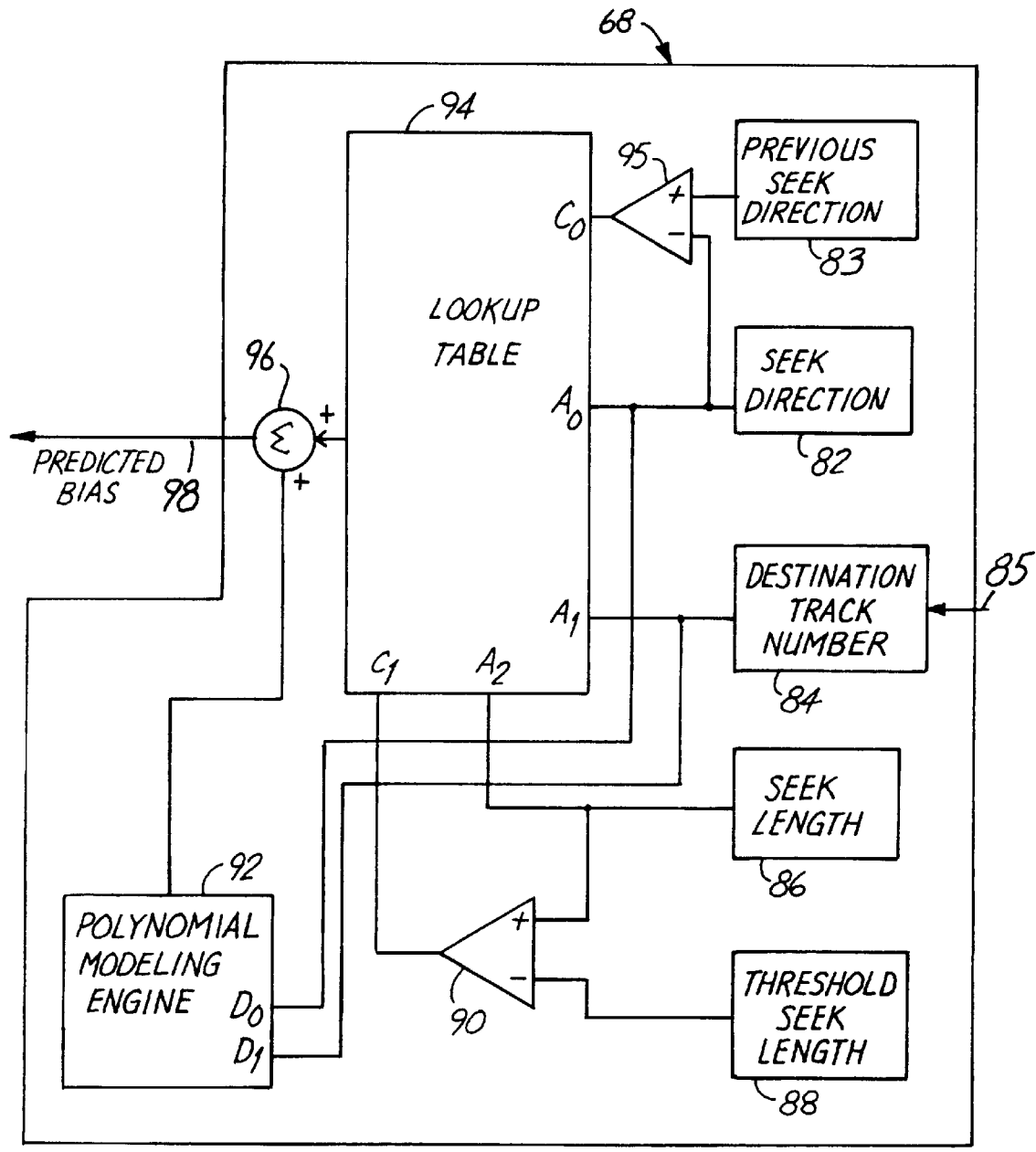
FIG. 6 is a block diagram showing the functional blocks of a bias predictor including a lookup table to model the hysteresis effects on actuator bias according to the present invention.

FIG. 6 is a block diagram of a bias predictor 68 modified to model the effects of hysteresis and other phenomena on actuator bias. The parameters utilized by bias predictor 68 include previous seek direction 83, seek direction 82, destination track number 84 (received for example as an input on line 85), seek length 86, and threshold seek length 88. In a preferred embodiment, destination track number 84 is input to bias predictor 68, seek direction 82 and seek length 86 can be derived by comparing destination track number 84 to the current track number (from servo information read by the head), and previous seek direction 83 and threshold seek length 88 are stored in registers of bias predictor 68. Polynomial modeling engine 92 generates a polynomial curve similar to what is known in the art, based on destination track number 84. The polynomial curve generated is essentially the average of the conventional inbound and outbound seek bias curves; an offset term based on seek direction 82 is utilized to distinguish between predicted bias for inbound and outbound seeks. Bias predictor 68 of the present invention introduces lookup table 94 as well, to adjust the value of predicted bias for the hysteresis effects and overshoot and undershoot effects which occur for short seeks following a change in the seek direction.

Seek length 86 is compared to threshold seek length 88 at comparator 90. Seeks that are longer than threshold seek length 88 will cause a first signal to be input to control input C1 of lookup table 94, while a seek length 86 less than threshold seek length 88 will cause a second signal to be input to control input C1 of lookup table 94. Previous seek direction 83 is compared to current seek direction 82 at comparator 95, which outputs a signal to control input C0 of lookup table 94 representing whether previous seek direction 83 is the same or opposite to seek direction 82. Lookup table 94 is configured so that a compensation value is output only when seek length 86 is less than threshold seek length 88 and the previous seek direction 83 is different than the seek direction 82, as indicated by control inputs C0 and C1. Threshold seek length 88 is preferably a parameter that is individually determined for each disc drive, depending on the bias curve characteristic for the particular drive. It is important that threshold seek length 88 is long enough to encompass any overshoot or undershoot effects occurring in the bias curve, as shown in FIG. 5. For the Barracuda 9 drive manufactured by Seagate Technology, Inc. of Scotts Valley, Calif., an exemplary threshold seek length is 125 tracks.

When the lookup table is triggered (short seeks following actuator direction reversals), locations in lookup table 94 are addressed by seek direction 82, destination track number 84, and seek length 86. Compensation values for the predicted bias are stored in lookup table 94 at locations addressed by these parameters, and the corresponding value is output from lookup table 94 and added to the predicted bias value output from polynomial modeling engine 92 at summing circuit 96. The output of summing circuit 96 on line 98 is the adjusted predicted bias value.

Figure 7:
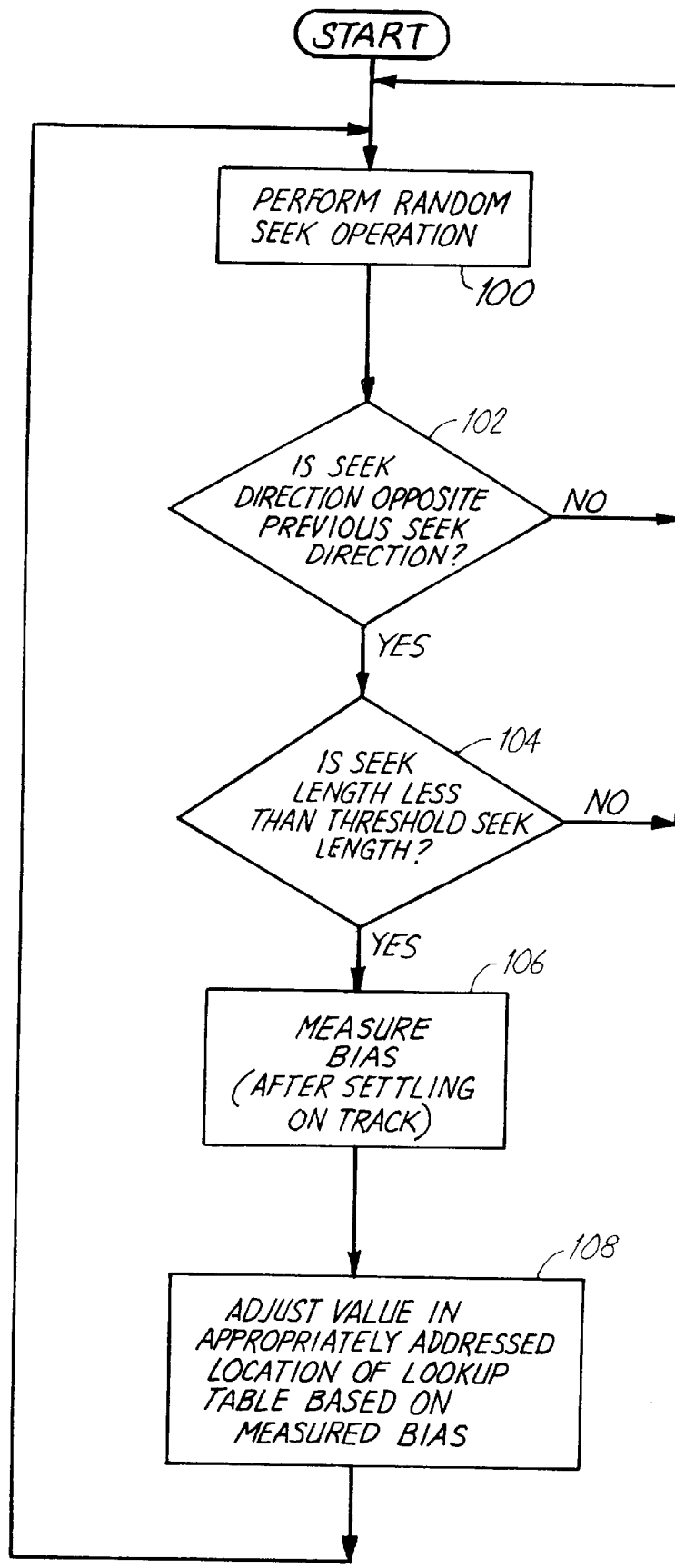
FIG. 7 is a flow diagram showing a process of calibrating the lookup table of the bias predictor according to the present invention.

FIG. 7 is a flow diagram illustrating a procedure for calibrating the lookup table of the present invention. First, a random seek operation is performed at step 100. The seek operation is actually pseudo-random, due to the inherent limitation on random number generation technology. In one embodiment, the seek operation is chosen to be a short seek requiring a reversal in actuator direction, since those seek operations exhibit effects for which the lookup table is useful. For purely pseudo-random seeks, it is then determined whether the seek direction is opposite to the previous seek direction, at decision block 102. If it is not, another random (pseudo-random) seek operation is performed at step 100. If the seek direction is opposite to the previous seek direction, then it is determined whether the seek length is less than a threshold seek length at decision block 104. If it is not, another random seek operation is performed at step 100. If the seek length is less than the threshold seek length, the bias after settling on track is measured at step 106. The value stored in the appropriately addressed location of the lookup table is adjusted at step 108, based on the measured bias. Another pseudo-random seek operation is then performed at step 100.

The process shown in FIG. 7 can be modified to be adaptively performed during normal operation of the disc drive system. The seek operation at step 100 could include any seek operation performed by a command from the seek controller. Thus, the lookup table would be updated after every qualifying seek operation performed by the disc drive system.

The present invention can predict bias with greater accuracy than prior art polynomial modeling schemes, and even than a bias predictor that mathematically computes and fits exponential curves to model the hysteresis effects on actuator bias. This accuracy is achieved by implementing and calibrating a lookup table to adjust the predicted bias for hysteresis effects, which allows the bias predictor to effectively customize its bias curves for each particular disc drive system. Because bias can be more accurately predicted, the time required to center a head of the disc drive system over a selected track of the disc is reduced, improving the performance of the disc drive.

Although the present invention has been described with reference to preferred embodiments, workers skilled in the art will recognize that changes may be made in form and detail without departing from the spirit and scope of the invention.

What is claimed is:

1. An actuator system for positioning a transducing head on an actuator arm over a selected track of a rotatable disc having a plurality of concentric tracks, the actuator arm including a motor responsive to an actuator signal and a bias signal to move the head with respect to the tracks, the system comprising:

a seek controller for applying the actuator signal to the motor to move the head between tracks of the disc; and
   a tracking controller for applying the bias signal to the motor to center the head over the selected track of the disc, the tracking controller including:
     a lookup table storing predicted bias values; and
     address means responsive to seek direction, previous seek direction, seek length and head position to select a predicted bias value from the lookup table, the tracking controller being responsive to the selected bias value to apply the bias signal.

2. The system of claim 1, including means for calibrating the lookup table by performing a plurality of seek operations, measuring the bias signal required to settle the head over a seek destination track, and storing a bias value representative of the measured bias signal in a selectively addressable location of the lookup table.

3. The system of claim 1, wherein the address means is responsive to a reversal in direction of traversal of tracks to select a predicted bias value from the lookup table.

4. The system of claim 3, wherein the tracking controller selectively accesses the predicted value of bias from the lookup table when the seek operation being performed requires traversal of a number of tracks that is less than a predetermined threshold number of tracks.

5. The system of claim 4, wherein the predetermined threshold number of tracks is selected to be no less than a minimum number of tracks for which the bias signal applied by the tracking controller to center the head over the selected track is accurately predicted by a mathematical bias model.

6. The system of claim 4, wherein the predetermined threshold number of tracks is selected to be no less than a maximum number of tracks for which the bias signal applied by the tracking controller to center the head over the selected track deviates from a mathematical bias model.

7. A method of positioning a transducing head on an actuator arm over a selected track of a rotatable disc having a plurality of concentric tracks by operating a motor, the method comprising the steps of:

(a) storing predicted bias values in locations of a lookup table that are addressable by seek direction, previous seek direction, seek length and head position;
   (b) applying a first actuator control signal to the motor to move the head between tracks of the disc;
   (c) accessing the lookup table to select a predicted value of bias addressed by seek direction, previous seek direction, seek length, and head position; and
   (d) subsequent to step (b), applying a second actuator control signal to the motor, based on the selected predicted value of bias, to center the head over the selected track of the disc.

8. The method of claim 7, wherein the step of storing predicted bias values includes calibrating the lookup table, the method of calibrating the lookup table comprising:

performing a plurality of seek operations;
   measuring the bias signal required to settle the head over a seek destination track; and
   storing a bias value representative of the measured bias signal in a location of the lookup table addressable by seek direction, previous seek direction, seek length and head position.

9. A disc drive having an actuator system for positioning a transducing head on an actuator arm over a selected destination track of a rotatable disc having a plurality of concentric tracks, the actuator system comprising:

a motor coupled to the actuator arm to effect movement of the actuator arm;
   a seek controller for applying an actuator signal to the motor to move the head between tracks of the disc;
   a tracking controller for applying a bias signal to the motor to center the head over the selected track of the disc, the tracking controller including:
     a polynomial modeling circuit providing a bias value based on a current track and the destination track;
     a lookup table for storing values to adjust the bias value provided by the polynomial modeling circuit; and
     address means for accessing the values stored in the lookup table to adjust the bias signal when a previous seek direction is not equal to the seek direction and a seek length is less than a predetermined threshold seek length.

10. The system of claim 9, including means for calibrating the lookup table by performing a plurality of seek operations, measuring the bias signal required to settle the head over a seek destination track, and storing an adjustment value based on the measured bias signal in a location of the lookup table addressable by seek direction, destination track number, and seek length.

11. The system of claim 9, wherein the predetermined threshold seek length is selected to be no less than a minimum number of tracks for which the bias signal applied by the tracking controller to center the head over the selected track is accurately predicted by the polynomial modeling circuit.

12. The system of claim 9, wherein the predetermined threshold seek length is selected to be no less than a maximum number of tracks for which the bias signal applied by the tracking controller to center the head over the selected track deviates from the bias signal provided by the polynomial modeling circuit.

13. A process of creating a lookup table to store predicted values of bias to compensate for bias variations from a mathematical bias model for an actuator arm carrying a transducing head in a disc drive system, the process comprising the steps of:

(a) applying actuator current to operate the actuator arm to perform a seek operation that is opposite in direction to a prior seek operation and has a seek length less than a predetermined threshold seek length;

(b) measuring the actuator current required to settle the head over a seek destination track;

(c) identifying a value of bias based on a difference between the measured actuator current and a mathematically predicted actuator current; and (d) storing the identified value of bias in a selectively addressable memory location.

14. The system of claim 13, wherein the predetermined threshold seek length is selected to be no less than a minimum number of tracks for which the actuator current applied to center the head over the seek destination track is accurately predicted by a mathematical bias model.

15. The system of claim 13, wherein the predetermined threshold seek length is selected to be no less than a maximum number of tracks for which the actuator current applied to center the head over the seek destination track deviates from a mathematical bias model.

16. The process of claim 13, wherein the selectively addressable memory location at which the identified value of bias is stored is addressable by seek direction, destination track number, and seek length.

17. The process of claim 13, further comprising repeating steps (a), (b), (c) and (d).

* * * * *